United States Patent

[11] 3,627,730

[72] Inventors Raymond Michael Moran, Jr.
Brick Town;
Robert Paul Kretow, Lakewood, both of N.J.
[21] Appl. No. 880,960
[22] Filed Nov. 28, 1969
[45] Patented Dec. 14, 1971
[73] Assignee Ciba Corporation
Summit, N.J.

[54] CURABLE EPOXY RESIN COMPOSITIONS CONTAINING PHTHALAMIC ACID-TYPE CURING AGENTS
7 Claims, No Drawings

[52] U.S. Cl. .................................................... 260/47 CA,
117/161 ZB, 260/2 EA, 260/18 EP, 260/37 EP,
260/78.4 EP, 260/88.3 A, 260/91.3

[51] Int. Cl. .................................................... C08g 30/12
[50] Field of Search ............................................ 260/47 EP,
47 CA, 47 CN, 2 EP, 2 CA, 18 EP, 59, 78.4 EP,
88.3 A, 91.3

[56] References Cited
UNITED STATES PATENTS
3,140,299  7/1964  Loncrini .................. 260/47 EP X

*Primary Examiner*—William M. Short
*Assistant Examiner*—T. Pertilla
*Attorneys*—Harry Goldsmith, Joseph G. Kolodny and Mario A. Monaco

ABSTRACT: Certain phthalamic acid compounds are used as latent hardeners for epoxy resin materials. The hardener effect is achieved by curing at elevated temperatures. The compositions are useful as adhesives and in coating applications.

CURABLE EPOXY RESIN COMPOSITIONS CONTAINING PHTHALAMIC ACID-TYPE CURING AGENTS

BACKGROUND OF THE INVENTION

This invention relates to the curing of epoxy resins. More particularly, it relates to the discovery of a class of compounds useful in the curing of epoxides to produce materials useful as high-temperature adhesives, castings, moldings and powder coatings.

There are a great many forms of epoxide resins available today, many of which can be cured by various means to provide final products tailored to a specific end use. Thus, solid, infusible resins have been prepared in this manner using a variety of amines as curing agents. Similarly, soft, flexible products have been obtained using certain metal salts as curing agents for some polyepoxides.

Epoxy systems normally are comprised of at least two compounds, one of which is the epoxy resin, and the other a hardener. These components must be stored separately, however, prior to use to prevent reaction to a cured or infusible state. In the production of cured epoxies, it is sometimes desirable to provide a mixture which will not cure under normal ambient conditions, but will remain as a stable blend for a reasonable period of time. Activation of such a mixture to a cured state, desirably, is then achieved by curing at an elevated temperature. The mixture should have a cure time at an elevated temperature that will not be oppressive from an economic point of view, but should not be so rapid as to prevent adequate working time. In addition to these characteristics, the resulting cured product should possess good physical and mechanical qualities so as to function in an acceptable manner. The art has not been altogether successful in achieving these results for various reasons. Thus, while a stable resin hardener mix may be obtained, the resulting blend is not always curable under reasonable conditions of time and temperature. Often, if curable, the blend is not cured to an entirely suitable state. Therefore, the art is continuously searching for new and improved hardener materials.

A new class of compounds has now been discovered which when blended with various epoxides results in a relatively stable mixture under normal conditions, but which because of latent hardening capabilities, exerts a curing effect on the epoxides at elevated temperatures. Such compounds may be described as phthalamic acid compounds of the formula

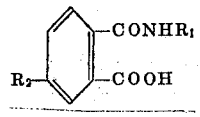

wherein $R_1$ is hydrogen, alkyl, aminoalkyl, phenyl, aminophenyl, alkylphenyl, alkoxyphenyl, benzyl alkylbenzyl, alkoxybenzyl, aminobenzyl, or pyridyl, and $R_2$ is hydrogen or

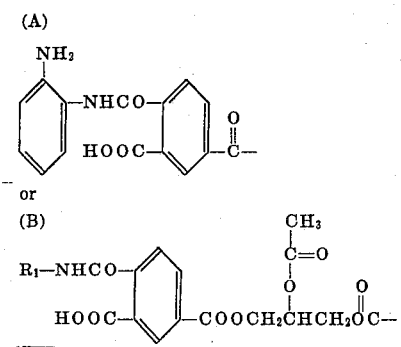

Illustrative of the foregoing $R_1$ groups are methyl, ethyl, propyl, aminomethyl, aminoethyl, aminobutyl, methylphenyl, methoxyphenyl, ethoxyphenyl, butoxyphenyl and the like. Preferred $R_1$ groups are hydrogen, 2-aminophenyl, p-methoxyphenyl, phenyl, aminomethyl, benzyl, and pyridyl. $R_2$ is preferably hydrogen, but is suitably A or B, especially when $R_1$ is aminophenyl.

Typical compounds with the above formula are
(a) phthalamic acid ($R_1$, $R_2$=hydrogen)
(b) N-aminomethyl phthalamic acid
($b_1$) N-(2-aminoethyl) phthalamic acid
(c) N, N'-bis(2-aminophenyl)-3,3',4,4'-benzophenone tetracarboxylic diacid-diamide
(d) N-benzyl phthalamic acid
(e) N-2-pyridyl phthalamic acid
(f) N-phenyl phthalamic acid (phthalanilic acid)
(g) N, N'-bis(2-aminophenyl)-3,3'-(2-acetoxy-1,3-glycerol)bis trimellitic acid-amide
(h) N-(p-methoxyphenyl) phthalamic acid Various conditions of cure time and temperature, and the physical properties of the cured resin will, of course, vary from compound to compound. In general, however, the epoxy compounds to be cured are those possessing more than one epoxide group and may be aliphatic, cycloaliphatic, aromatic, and the like, and may carry inert substituents such as chloro and others well known and encountered in the art, and may be monomers or polymeric. They may also contain ether linkages and ester groups as well. Especially preferred are epoxides prepared from Bisphenol A, a phenol or cresol and epichlorhydrin, although virtually any epoxide produced from a polyhydric alcohol and epichlorhydrin may be used. Preferably, epoxides having an epoxy value of 0.3 to 0.7 equivalent per 100 g. of material are suitable. Typical epoxides are those produced from epichlorhydrin and a polyhydric phenol or alcohols such as resorcinol, catechol, 1,2,6-hexanetriol, sorbitol, mannitol pentaerythritol, trimethylolpropane, glycerol allyl ether. Similarly, polymeric materials containing polyhydric hydroxyls such as appropriately substituted polyethers and polyesters may likewise be employed. For example, there may be employed vinyl cyclohexene dioxide, epoxidized mono-, di- and triglycerides, butadiene dioxide, 1,4-bis (2,3-epoxypropoxy) benzene, 4,4'-bis (2,3-epoxypropoxy) diphenyl ether, 1,8-bis (2,3-epoxypropoxy) octane, 1,4-bis (2,3-epoxypropoxy) cyclohexane, 4,4'-bis (2-hydroxy-3,4-epoxybutoxy) diphenyldimethylmethane, 1,3-bis (4,5-epoxypentoxy) 5-chlorobenzene, 1,4-bis (3,4-epoxybutoxy) 2-chlorocyclohexane, ethylene glycol diglycidyl ether, resorcinol diglycidyl ether, 1,2,5,6-diepoxyhexyne-3, 1,2,5,6-diepoxyhexane and 1,2,3,4-tetra (2-hydroxy-3,4-epoxybutoxy) butane.

Other examples include the glycidyl polyethers of polyhydric phenols obtained by reacting a polyhydric phenol with an excess, e.g. 4 to 8 mol excess, of a chlorohydrin, such as epichlorohydrin and diglycerol chlorohydrin. Thus, a polyether, which is substantially diglycidyl ether of 2,2-bis (2,3-epoxypropoxyphenyl) propane is obtained by reacting bisphenol 2,2-bis (4-hydroxyphenyl) propane with an excess of epichlorohydrin in an alkaline medium. Other polyhydric phenols that can be used for this purpose include resorcinol, catechol, hydroquinone, methyl resorcinol, or polynuclear phenols, such as 2,2-bis (4-hydroxyphenyl) butane, 4,4'-dihydroxybenzophenone, bis (4-hydroxyphenyl) ethane, and 1,5-dihydronaphthalene.

Still a further group of the polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tripentaerythritol, polyglycerol, dulcitol, inositol, carbohydrates, methyltrimethylolpropane, 2,6-octanediol, 1,2,4,5-tetrahydroxycyclohexane, 2-ethylhexanetriol-1,2,6, glycerol methyl ether, glycerol allyl ether, polyvinyl alcohol and polyallyl alcohol, and mixtures thereof. Such polyepoxides may be exemplified by glycerol triglycidyl ether, mannitol, tetraglycidyl ether and sorbitol tetraglycidyl ether.

A further group of the polyepoxides comprises the polyepoxy polyesters obtained by esterifying a polycarboxylic acid with an epoxy-containing alcohol, such as, for example, the diglycidyl ester of adipic acid, the diglycidyl ester of malonic acid, and the diglycidyl ester of succinic acid.

Typically, the benefits of the invention are obtained by blending the hardener with the epoxides, usually employing standard blending equipment known in the art, together with any other adjuvants desired, and then when ready for use in service, by activating the hardener. In general, the amount of hardener used will be at or near the stoichiometric amount required for the specific ingredients. Usually, this will range from about 15 to 75 parts of hardener per hundred parts of resin (phr). For the preferred compositions of the invention, this range will be about 15 to 50 phr.

The conditions of time and temperature used for cure ordinarily as previously stated, will vary from blend to blend. In general, however, elevated cure temperatures ranging from 130° to 170° C. and preferably 140° to 160° C. will produce physically desirable resin products within 30 minutes to 5 hours, and usually within 2 hours. Of course, these cures can be effected in the same attitude as the end use where the physical conditions permit. Most preferably, the cures are effected by a preliminary gel period at a low temperature followed by storage for a somewhat longer period at a more elevated temperature. Best results are obtained by an initial gelling at around 90° to 100° C. followed by heating at around 130° to 170° C. for 1/2 to 5 hours, for example. Solid resins are generally slower curing than liquid resins and may require the use of chemical accelerators or less preferably higher temperature or longer cure times. It is not, under most circumstances, ordinarily desired to raise the curing temperature to accelerate these times because in so doing there is a tendency for the reaction mixture to foam. Therefore, it is preferred to use such chemical accelerators as isoniazid, dicyandiamide, imidazole, and the like. These are usually employed at levels from about 0.1 to 5 phr, and preferably 0.5 to 3 phr. Other adjuvants such as fillers, coloring agents and the like, typified by silica, pumice, pigments and the like, may also be used.

The products of the present invention are stable prior to cure for relatively long periods of time under normal conditions. It is not unusual for the blend to remain latent or dormant for periods of 10 months or more when stored at 25° C. However, storage times longer than 3 months at temperatures of 40° C and higher should be avoided.

The cured products obtained from the composition of this invention find application in a variety of areas including high temperature adhesives, electrical potting and coating applications, and the like. Their outstanding dielectric properties together with good tensile and flexural properties make these materials eminently suitable for electrical insulation applications. As such, they are quite favorably compared to aromatic amine-cured epoxides.

Certain of the latent hardener compounds of the present invention are novel. This is, those compounds having $R_2$ equal to B, are novel and may be prepared reacting one equivalent of 4,4'-(2-acetyl-1,3-glycerol) bis anhydro trimellitate with two equivalents of an $R_1$-$NH_2$ compound in an inert solvent such as dimethylformamide at low temperatures, such as 10–50° C. and preferably 10–40° C. until the reaction is complete. Suitable reaction times are 1–5 hours. The reaction product is conveniently isolated, by removal of the solvent under vacuum. For example $R_1$-$NH_2$ may be, ammonia, butylamine, 1,4-diaminobutane, 2-methylaniline, aniline, 2-aminoaniline, 2-methoxy-aniline, benzylamine, 3-ethylbenzylamine, 2-methoxybenzylamine, 2-aminobenzylamine or 3-aminopyridine.

The following Examples are illustrative of preferred embodiments of the invention.

EXAMPLE I

Thirty-three parts by weight of N,N'-bis (2-aminophenyl)-3,3', 4,4'-benzophenone tetracarboxylic diacid diamide are blended with 100 parts of a liquid epoxy resin prepared from Bisphenol A and epichlorhydrin and having an epoxy value of 0.53 equivalents per 100 g. on a three-roll mill at about 23° C, until a smooth, pasty blend is obtained. This material can be cured at elevated temperatures in a short period of time, and has the ability to retain that characteristic for over a year. This is demonstrated by observing the amount of time required to effect gelling or hardening at the indicated cure temperature. Such a gel-time test is as follows:

A cure plate is heated to 150±0.5 C. and coated with a thin film of release agent. 1.0 g.±0.1 g. of test sample is spread lightly in a 2 inch × 2 inch square section on the cure plate with a back-and-forth movement using a spatula. When the viscosity of the material increases, as noted by drag on the spatula, the spatula is removed. The point at which the material does not string but comes up in a film when the spatula is lifted is the end point. The time from the start is noted.

Using this test, it is found that the initial gel time is about 8 minutes at 150° C. for a 1 g. mix.

At the end of one year the above material had a gel time at 150° C. of 4 minutes. This indicates that the blend gels within a reasonable time for periods up to at least one year.

EXAMPLE II

The material prepared in Example I, except that 25 phr of hardener was used, was heated at 90° C. until it gelled and was then post-cured at 150° C. for 5 hours. The deflection temperature *1 on the material obtained was 160° C.

*1. Deflection temperature is the temperature required to deflect a 5 inch × ½ inch × ½ inch slab of test material 0.010 inch under a load of 264 p.s.i. and a temperature gradient increase of 2° C./min. This is a measure of the thermal relaxation behavior of the material with the higher values indicating good thermal stability.

EXAMPLE III

Following the procedure of Example I, smooth blends are obtained using the following latent hardeners in the amount indicated in place of the acid described in that example

|  | phr | gel time |
|---|---|---|
| 1. phthalamic acid ($R_1$, $R_2$ = hydrogen) | 50 | 19 min. |
| 2. N,N'-bis (2-aminophenyl) 3,3' (-acetoxy-1,3-glycerol) bis trimellitic acid-amide | 44 | 4 min. |
| 3. N-phenyl phthalamic acid (phthalanilic acid) | 63 | 18 min. |

From the above, it can be seen that relatively short gel times are obtained from the systems, thus representing products which are eminently suited for applications wherein long elevated temperature gel times are not desirable. On the other hand, other latent hardeners of the invention have much longer gel times at elevated temperature of the order of 2 hours, and are thus suitable for example in applications where long handling times are required.

EXAMPLE IV

N,N'-bis (2-aminophenyl)-3,3'-(2-acetoxy-1,3-glycerol bis trimellitic acid-amide 289.2 g (0.6 mol) of 4,4'-(2-acetyl-1,3-glycerol) bis anhydro trimellitate is reacted with 129.6 g of 1,2-diaminobenzene (1.2 mols) in 800 mls. of dimethylformamide at below 35° C. for 3 hours. The solvent is then removed under vacuum leaving a brown solid which is ground to a fine powder and air-dried. The product (410 g.) melts at 125-140° C. with decomposition and has an acid number of 128 mg./g.

What is claimed is:

1. A latent curing resin composition capable of being cured at elevated temperatures comprising a 1, 2 epoxy resin, and a compound having the formula

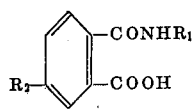

wherein $R_1$ is hydrogen, alkyl, aminoalkyl, phenyl, aminophenyl, alkylphenyl, alkoxyphenyl, benzyl, alkylbenzyl, alkoxybenxyl, aminobenzyl, pyridyl, and $R_2$ is (A)

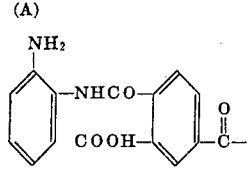

or
(B)

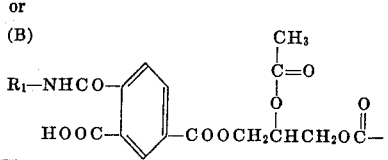

said compound being present in an amount of from 15 to 75 parts per hundred parts of resin.

2. The composition of claim 1 wherein $R_2$ is radical A.
3. The composition of claim 2 wherein $R_1$ is aminophenyl.
4. The composition of claim 1 wherein $R_1$ is hydrogen.
5. The composition of claim 1 wherein $R_1$ is phenyl.
6. The composition of claim 1 wherein $R_2$ is the radical B.
7. The composition of claim 6 wherein $R_1$ is aminophenyl.

* * * * *